United States Patent
Liu (12)

(10) Patent No.: US 6,310,989 B1
(45) Date of Patent: Oct. 30, 2001

(54) FIBER OPTICAL CIRCULATOR

(76) Inventor: Zhimin Liu, 4025 Ribbon Dr., San Jose, CA (US) 95130

( * ) Notice: Subject to any disclaimer, the term of this patent is extended or adjusted under 35 U.S.C. 154(b) by 0 days.

(21) Appl. No.: 09/238,013

(22) Filed: Jan. 26, 1999

Related U.S. Application Data

(60) Provisional application No. 60/075,757, filed on Feb. 23, 1998.

(51) Int. Cl.[7] ............................. G02B 6/34; G02B 6/27; G02B 5/30
(52) U.S. Cl. ............................. 385/11; 385/36; 385/47; 359/496
(58) Field of Search ......................... 385/11, 18, 31, 385/36, 39, 47; 359/484–501

(56) References Cited

U.S. PATENT DOCUMENTS

| | | | |
|---|---|---|---|
| 5,471,340 | * 11/1995 | Cheng et al. | 359/281 |
| 5,878,176 | * 3/1999 | Cheng | 385/11 |
| 5,930,039 | * 7/1999 | Li et al. | 359/484 |
| 6,052,228 | * 4/2000 | Xie et al. | 359/496 |
| 6,154,581 | * 11/2000 | Lu et al. | 385/11 |
| 6,192,175 | * 2/2001 | Li et al. | 385/27 |

* cited by examiner

*Primary Examiner*—John D. Lee
*Assistant Examiner*—Juliana K. Kang
(74) *Attorney, Agent, or Firm*—Thomas I. Rossa; Tony D. Chen; Jerry Fong

(57) ABSTRACT

A fiber optical circulator wherein optical fibers of three ports share one glass capillary, one collimator lens and one walk-off crystal. Three optical fibers lie on a plane in a glass capillary that is aligned with a collimator lens concentrically. A light fed into the fiber of port 1, which is off optical axis of collimator lens, is collimated with an angle θ to the axis of collimate lens. The collimated beam is divided into two orthogonal components by a first crystal. A device group consisting of one Faraday rotator and one pair of Half Wave Plates transfers the State Of Polarization (SOP) of two components into the same. The angled part of a combined prism bent both beams to be parallel to optical axis of system. The lights pass through a second crystal without displacement due to their SOP. Their SOP receive 90° rotations by a round trip in followed Faraday rotator with help of a reflection film on the backside or a mirror. The light components receive a displacement onto optical axis after the second crystal due to their rotated SOP, pass through the flat part of combined prism, changes their SOP with help of the group of Rotator and wave plate, combined into one beam by the first crystal, and is focused into the fiber of port 2 by collimate lens. The process of port 2 to port 3 is similar to above. The light fed into fiber of port 2 is collimated to be parallel to the optical axis. The collimated beams pass though all parts then reflected by the reflection film or mirror. The light beam in return path receives a displacement by the second crystal and bending angle by the angled part of combined prism. The light is finally focused into the fiber of port 3 by the collimate lens. Since this circulator requires less optical parts, it achieves compact size and low cost simultaneously.

16 Claims, 4 Drawing Sheets

FIBER OPTICAL CIRCULATOR

This application claims benefit of provisional application Ser. No. 60/075,757 filed on Feb. 23,1998.

BACKGROUND OF THE INVENTION

1. Field of the Invention

The present invention generally relates to the field of fiber optical circulators. More particularly, the present invention relates to the field of compact, low cost and high performance optical circulators with at least three ports, which can expanded to more ports.

2. Description of the Prior Art

In general, the fiber optical circulator transfers light from a port to another sequentially. It has at least three ports. The light enters the circulator through a first port and exits through a second port. Another light that enters the second port exits through a third port and so on. Since the optical circulator is an inherently non-reciprocal device, the light never goes to other ports.

Such an optical device has a broad range of applications in the field of fiber optic communication systems, such as in bi-directional communication, dense Wavelength Division Multiplexing (WDM) and Dispersion Compensation.

Many types of optical circulators have been developed and manufactured. However, the high cost and bulky size of the circulator have limited the popular acceptance for system applications.

SUMMARY OF THE INVENTION

The present invention is a novel and unique compact fiber optical circulator that consists of three optical fibers contained in one capillary sharing one collimate lens and one walk-off crystal. Its unique structure reduces both the costs of material and the overall size of the circulator. A folding configuration is used to further reduce the size by reducing the number of crystals used.

In summary, a light beam is fed from a fiber in the first port of a capillary, then collimated before being bent to be parallel to the optical axis of the collimate lens by the angled part of a combined prism. The light beam then passes to a birefringent crystal where it is divided into two orthogonal components, o and e light component with displacement. Then the light components pass through a device group consisting of a Faraday rotator and a pair of Half Wave Plate set in different orientation that changes the State of Polarization (SOP) of two components into the same. The light components then passed a second crystal which optical axis being set in the way that allows passage of the components with that SOP without displacement.

The second Faraday rotator following the crystal then rotates both light components 45°, and the light components are reflected off a mirror, passing back through the second Faraday rotator, which rotates the SOP of the light components an additional 45°, thereby putting the SOP of both components perpendicular to that of ongoing beam. The light components then pass back through the second crystal and receive displacement due to their SOP. Then the light components pass back through the device group of half wave plates and first Faraday rotator, transferring both SOP of light components into orthogonal, are combined into one light beam by the first crystal, thereafter the beam passes through a flat portion of the combined prism and is focused into a second fiber of the capillary by the collimate lens.

The optical path of port 2 to port 3 is similar to above. The SOP in each optical part are the same as that in process of port 1 to 2. The light from the fiber in port 2 is collimated to be parallel to the optical axis. It passes through the central flat part of prism and other parts, and is reflected by the mirror. The return beams from the mirror receive a displacement from the second crystal. The displacement shifts the light beam to the angled part of the combined prism that provides angle correction for beam to meet requirement for the fiber to receive the light. The beam is finally focused into the fiber in port 3.

The invention may be expanded to five or more ports by the use of an n-phase prism with n surfaces set in different angles in place of the combined prism.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a folded fiber optical circulator using three fibers in one capillary;

FIG. 1b is a side view of the preferred embodiment fiber optic circulator shown in FIG. 1a;

FIG. 2 depicts the optical path and polarization states of an intersection after each functional element;

FIG. 3 depicts a another alternative embodiment of the invention of a fiber optic circulator in the form of a multi-port optical circulator;

FIG. 4 is another alternative embodiment of the present invention; and

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1A:
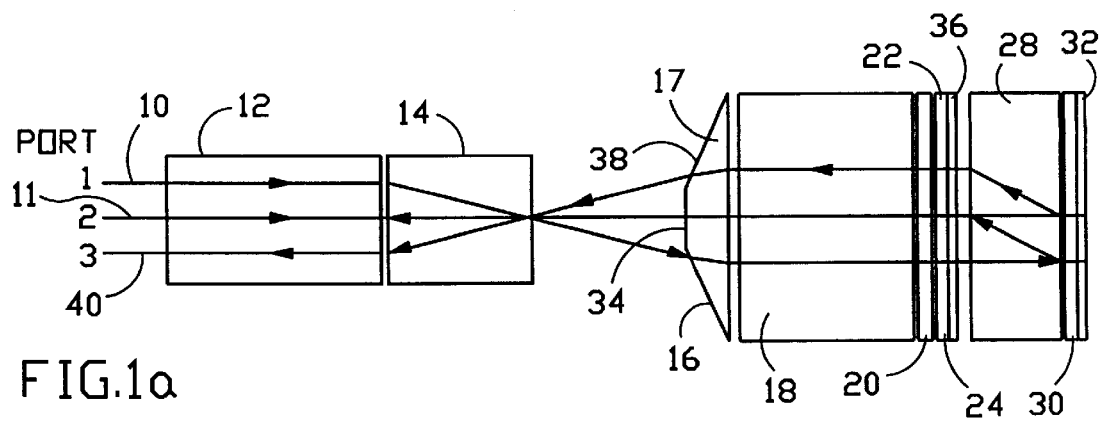
FIG. 1a is a top plan view of a preferred embodiment of the invention.
Figure 1B:
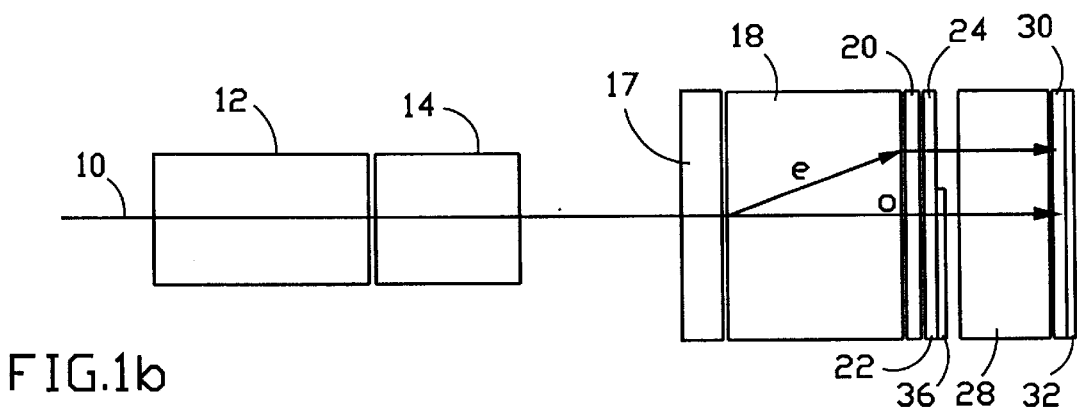

As shown in FIG. 1a, the optical fiber 10 of port 1 is positioned in a triple-core glass capillary 12, above the optical axis of the collimator lens 14. The collimated light beam emitted by the lens 14 has an angle θ with the optical axis of the collimate lens. The collimated beam strikes on the angled part 16 of prism 17. Prism 17 is made of a homogeneous material that is designed to bend such a light beam to be parallel to the optical axis. After the birefringent crystal 18, the light beam is divided into two orthogonal components o light and e light with a displacement, as shown in FIG. 1b.

Figure 2A:
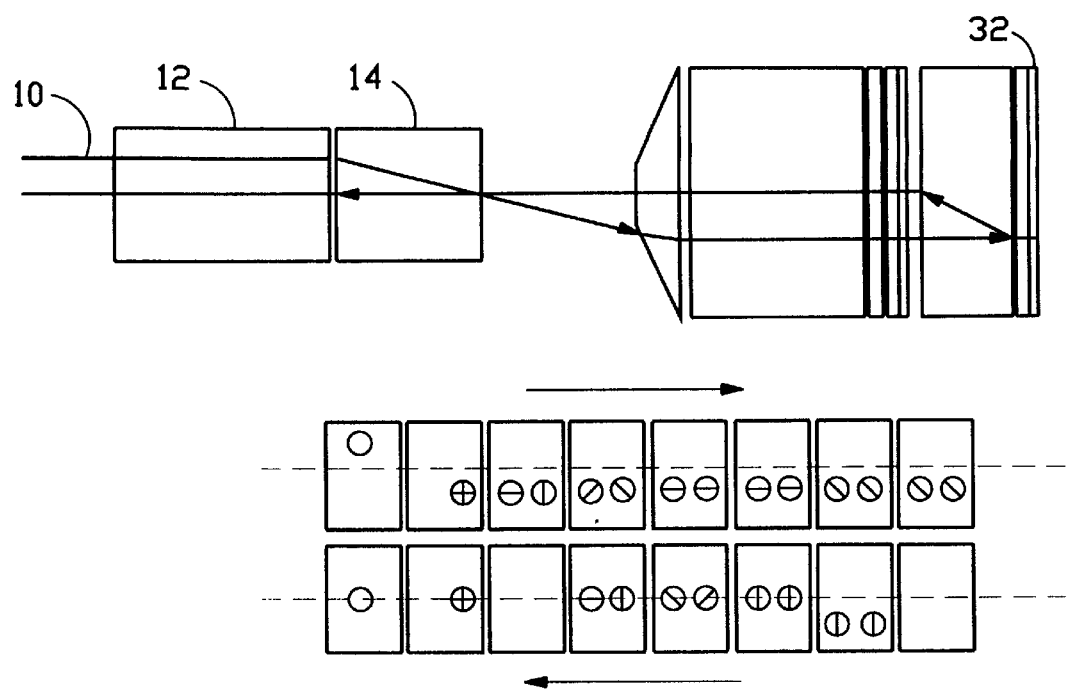
FIG. 2a depicts the optical path and polarization states and the intersection positions of light from port 1 to port 2.
Figure 2B:
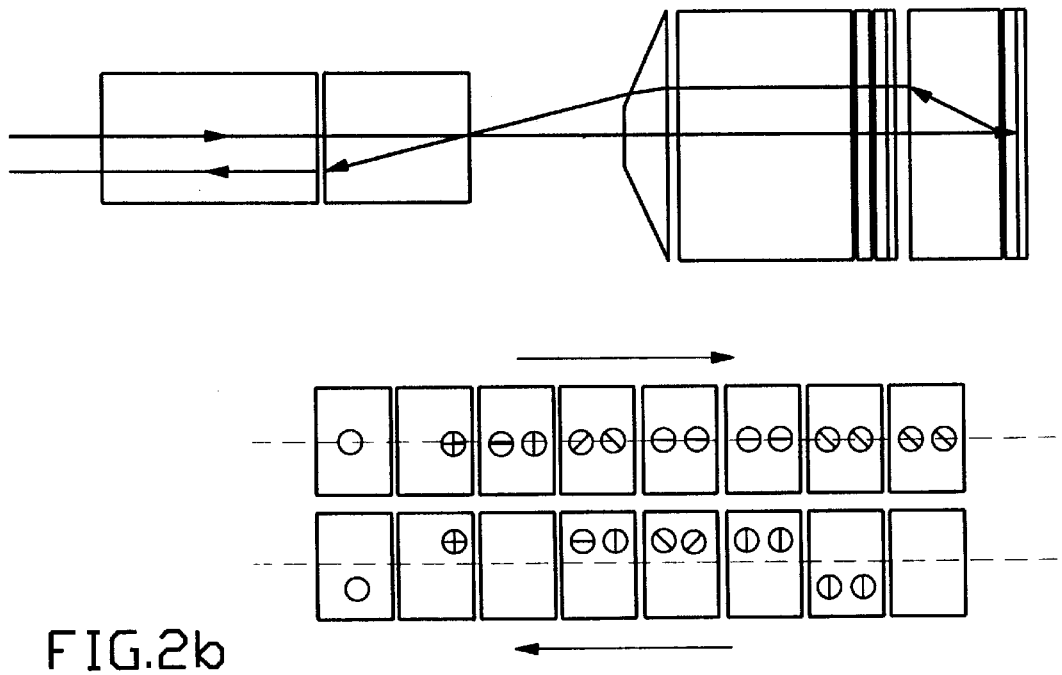
FIG. 2b depicts the optical path and polarization states and the intersection positions of light from port 2 to port 3.

The optical path, the State of Polarization (SOP) and light beam positions on the intersection of each functional element are shown in FIG. 2. The displacing direction of crystal 18 can be in either the vertical or in the horizontal direction. The first Faraday rotator 20, which is followed by a pair of half wave plates, rotates the SOP of both o and e components counterclockwise 45°.

Figure 1C:
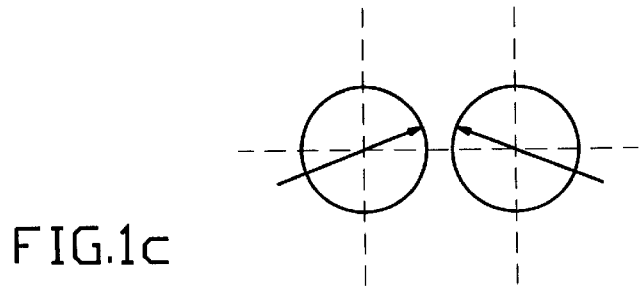
FIG. 1c shows optical axes of the half wave plates.

The optical axis of the half wave plate 22 is set at an angle of 22.5° against the horizontal and half wave plate 24 is set at −22.5° as shown in FIG. 1c. Half wave plates 22 and 24 are positioned to cover the beam of o and e components, respectively. The SOP of the two components become the same, in a horizontal direction after half wave plates 22 and 24 as shown in FIG. 2a.

Then the light passes through crystal 28 that is designed to allow a light with SOP in horizontal direction to pass without displacement and to create displacement for light with SOP in vertical direction. Then the light beams pass through a second Faraday rotator 30 that rotates both component 45°. The light beams passing the rotator are reflected off a mirror 32 and pass through second Faraday rotator 30 again.

Since the Faraday rotator is an optically non-reciprocal or nonreversible element, it rotates the SOP of the light components an additional 45°. The SOP of both components now becomes the same in vertical. The light components with vertical SOP then receive a displacement in birefringent crystal 28. The crystal 28 is designed to move the light onto the optical axis.

The half wave plates 22 and 24 and the first Faraday rotator 20 transfer the two light components into orthogonal, the same as that of on-going beam just after crystal 18. Then the light components are combined into one beam by crystal 18. The combined beam passes through the central flat part 34 of the combined prism 17, and is focused into the fiber 11 of port 2 by collimator lens 14.

A quarter wave plate can be used to replace the second Faraday rotator 30, which turns the SOP 90° also by a round trip of the light components through it. In some applications of communication systems, there is a need to monitor transmitted optical power. This invention is ideal for such applications. The reflection mirror 32 can be coated with partial reflection, leaving a small part of the light to be transmitted to a photo detector, which can be set behind mirror 32 with no need to interrupt the light path and additional optical components. The mirror 32 can be omitted by coating a reflection film on the back of Faraday rotator 30 or quarter wave plate. It should be noted that the length of the optical path of two components is different and this causes Polarization Mode Dispersion (PMD). The glass plate 36 compensates for the differences in optical paths for the two light components to eliminate PMD.

The SOP in the optical path of port 2 to port 3 is the same as above. Because the fiber 11 of port 2 is on the optical axis of collimator lens 14, the collimated beam is parallel to the axis. It passes through the central flat part 34 of prism 17 and is divided into orthogonal o and e components by crystal 18. First Faraday rotator 20 and half wave plates 22 and 24 transfer SOP of two components into the same as that described in process of port 1 to port 2.

The light passes through crystal 28 with no displacement, and travels round trip through second Faraday rotator or quarter wave plate 30, being reflected by mirror 32. The SOP of the reflected light rotates 90°. The beam gets displacement in crystal 28 due to the rotated SOP. The SOP of the light components are changed into orthogonal by half wave plates 22 and 24 and by first Faraday rotator 20. Crystal 18 combines the two components into one beam. Due to the displacement in crystal 18, the beam hits the angled part 38 of the prism 17 and bends to the axis of collimator lens 14 in an angle of θ so it is focused into the fiber 40 of port 3 by the lens 14.

Figure 3A:
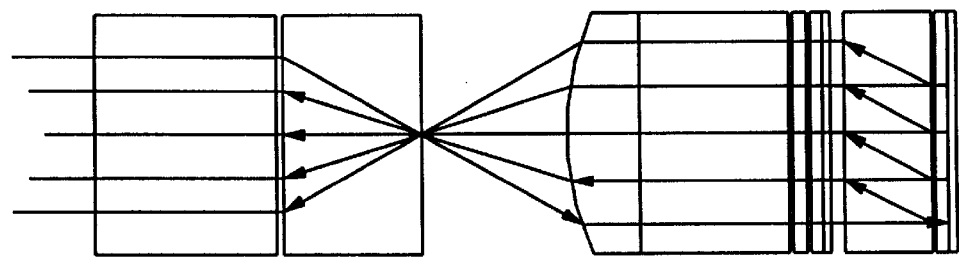
FIG. 3a shows optical paths in a folded five port optical circulator using a 5-phase prism, including the optical paths of port 1 to port 2, port 2 to port 3, port 3 to port 4, and port 4 to port 5.
Figure 3B:
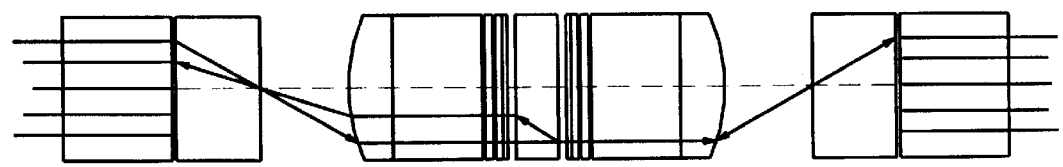
FIG. 3b shows the optical paths in a ten port optical circulator using a pair of 5-phase prisms, including the optical paths of port 1 to port 2 and port 2 to port 3.

The above designs can be expanded to five ports or more by n-phase prism as shown in FIGS. 3a and 3b. The n-phase prism is a prism having n surfaces with different angles. In the configuration of a folded circulator, the n-phase prism results in n-port circulator. In the configuration of a dual side circulator as shown in FIG. 3b, n-phase prism results in 2 n-port circulator.

Figure 4A:
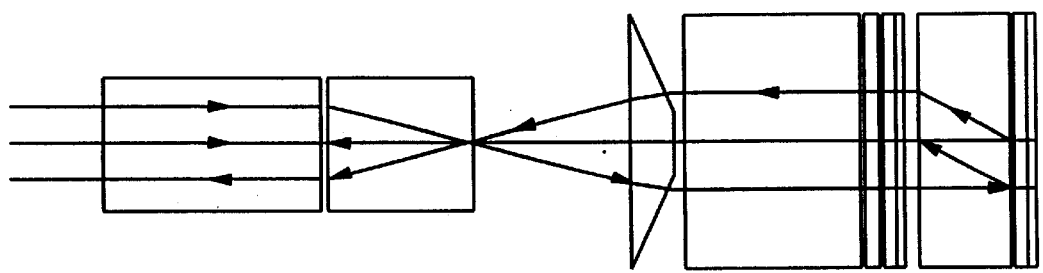
FIG. 4a shows the exchange of positions of the angle corrector and the walk-crystal.
Figure 4B:
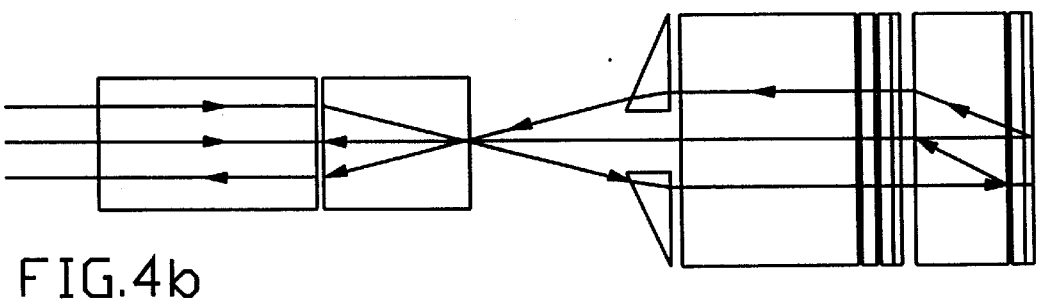
FIG. 4b shows an alternative prism group to replace the prism in the present invention.
Figure 4C:
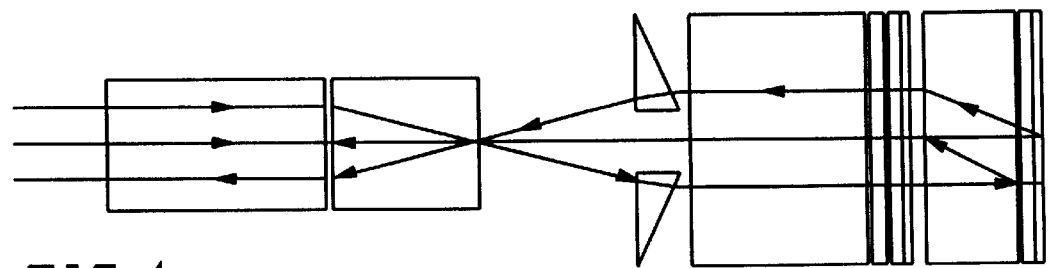
FIG. 4c shows the exchange of positions of the prism group in FIG. 4b.

Some variations in this configuration are available also. For example, the positions of the prism and the first crystal 18 can be exchanged with each other with little difference in performance. FIG. 4 shows some variations in prism configuration. The prism 17 in FIG. 1a can be positioned in reverse as shown in FIG. 4a. Two separate prisms with the same prism angles can replace the single prism as shown in FIG. 4b and 4c. All above variations are alternative embodiments of the present invention.

Defined in detail, the present invention is a fiber optical circulator, comprising; (a) a triple-core glass capillary for housing three optical fibers; (b) a collimator lens for collimating a light beam; (c) a glass prism having a prism angle designed to correct the angle of said collimated light beam, causing said collimated light beam to be parallel to a central axis of said circulator; (d) a birefringent crystal for dividing said collimated light beam into two orthogonal components with a displacement; (e) a first Faraday rotator for rotating the state of polarization of said two components; (f) a pair of half-wave plates each for passing a respective one of said two components, and causing said two components to be in the same state of polarization in a horizontal direction; (g) a planar crystal having an optical axis designed to allow light components polarized in said horizontal direction to pass without displacement but create a displacement in light components polarized in a vertical direction, such that said two components in the same state of polarization in said horizontal direction passes the planar crystal without displacement; (h) an optical component for rotating the state of polarization of said two components for 90 degrees by a round trip path therethrough; and (i) a mirror for reflecting said two components back into said optical component.

Defined broadly, the present invention is a fiber optical circulator, comprising: (a) a multi-core glass capillary for arranging multiple optical fibers of a multiple ports respectively; (b) a multi-phase glass prism; (c) a birefringent crystal for dividing a light beam into two components; (d) a planar crystal having an optical axis designed to allow light components polarized in a first direction to pass without displacement but create a displacement in light components polarized in a second direction which is perpendicular to the first direction; (e) at least one optical means for rotating the state of polarization of said two components and causing said two components to be in the same state of polarization in said first direction to pass said planar crystal without displacement; and (f) reflective surface means for reflecting said two components back through said at least one optical means and said planar crystal.

Defined more broadly, the present invention is fiber optical circulator, comprising: (a) a multi-core capillary for arranging multiple optical fibers of multiple ports respectively; (b) a multi-phase glass prism; and (c) means for reflecting a light beam which has passed through an optical path back into and pass through the optical path, the optical path correcting the angle of a light beam and allowing the light beam to pass with or without displacement in its components depending on the state of polarization of such components.

Of course the present invention is not intended to be restricted to any particular form or arrangement, or any specific embodiment disclosed herein, or any specific use, since the same may be modified in various particulars or relations without departing from the spirit or scope of the claimed invention herein above shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A fiber optical circulator, comprising:
   a. a triple-core glass capillary for housing three optical fibers;
   b. a collimator lens for collimating a light beam;
   c. a glass prism having a prism angle designed to correct the angle of said collimated light beam, causing said collimated light beam to be parallel to a central axis of said circulator;
   d. a birefringent crystal for dividing said collimated light beam into two orthogonal components with a displacement;
   e. a first Faraday rotator for rotating the state of polarization of said two components;
   f. a pair of half-wave plates each for passing a respective one of said two components, and causing said two components to be in the same state of polarization in a horizontal direction;
   g. a planar crystal having an optical axis designed to allow light components polarized in said horizontal direction to pass without displacement but create a displacement in light components polarized in a vertical direction, such that said two components in the same state of polarization in said horizontal direction passes the planar crystal without displacement;
   h. an optical component for rotating the state of polarization of said two components for 90 degrees by a round trip path therethrough;
   i. a mirror for reflecting said two components back into said optical component; and
   j. wherein said glass prism has a pair of symmetrical inclined surfaces for correcting the angle of off-axis light beam and one straight surface for providing passing path to on-axis light beam.

2. The fiber optical circulator as claimed in claim 1, wherein said three optical fibers are arranged in parallel with a middle one aligned with a central axis of said triple-core glass capillary.

3. The fiber optical circulator as claimed in claim 1, further comprising means for compensating difference in the respective optical paths of said two components to eliminate polarization mode dispersion.

4. The fiber optical circulator as claimed in claim 1, wherein said optical component is a second Faraday rotator.

5. The fiber optical circulator as claimed in claim 1, wherein said optical component is a quarter wave plate.

6. A fiber optical circulator, comprising:
   a. a multi-core glass capillary for arranging multiple optical fibers of multiple ports respectively;
   b. an n-phase glass prism having n surfaces with different angles;
   c. a birefringent crystal for dividing a light beam into two components;
   d. a planar crystal having an optical axis designed to allow light components polarized in a first direction to pass without displacement but create a displacement in light components polarized in a second direction which is perpendicular to the first direction;
   e. at least one optical means for rotating the state of polarization of said two components and causing said two components to be in the same state of polarization in said first direction to pass said planar crystal without displacement; and
   f. reflective surface means for reflecting said two components back through said at least one optical means and said planar crystal.

7. The fiber optical circulator as claimed in claim 6, wherein said multiple optical fibers are arranged in parallel.

8. The fiber optical circulator as claimed in claim 6 wherein said n-phase glass prism has multiple pairs of symmetrical inclined surfaces for correcting the angle of off-axis light beam and one straight surface for providing passing path to on-axis light beam.

9. The fiber optical circulator as claimed in claim 6, further comprising means for compensating difference in the respective optical paths of said two components to eliminate polarization mode dispersion.

10. The fiber optical circulator as claimed in claim 6, wherein said at least one optical means includes an optical component for rotating the state of polarization of said two components for 90 degrees by a round trip path therethrough.

11. The fiber optical circulator as claimed in claim 10, wherein said optical component is a Faraday rotator.

12. The fiber optical circulator as claimed in claim 10, wherein said optical component is a quarter wave plate.

13. The fiber optical circulator as claimed in claim 6, wherein said reflective surface means is a mirror.

14. The fiber optical circulator as claimed in claim 6, wherein said reflective surface means is a reflection film coated behind said at least one optical means.

15. The fiber optical circulator as claimed in claim 6, wherein said reflective surface means is partially reflective to allow partial transmission of light through said reflective surface means.

16. The fiber optical circulator as claimed in claim 15, further comprising means arranged after said partially reflective surface means for monitoring transmitted optical power between said multiple ports.

* * * * *